(12) United States Patent
Friedrich et al.

(10) Patent No.: US 12,006,974 B2
(45) Date of Patent: Jun. 11, 2024

(54) SHEET METAL PANEL RACEWAY INCLUDING RECESSES

(71) Applicant: AKTIEBOLAGET SKF, Gothenburg (SE)

(72) Inventors: Hans-Juergen Friedrich, Königsberg-Römershofen (DE); Norbert Huhn, Schweinfurt (DE); Thomas Kettner, Bamberg (DE); Harald Metz, Randersacker (DE); Alfred Radina, Poppenlauer (DE); Jonas Schierling, Hassfurt (DE); Maximilian Soellner, Bundorf (DE); Markus Volkmuth, Werneck-Zeuzleben (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/358,267

(22) Filed: Jun. 25, 2021

(65) Prior Publication Data

US 2022/0003271 A1    Jan. 6, 2022

(30) Foreign Application Priority Data

Jul. 2, 2020   (DE) .......................... 102020208272.3

(51) Int. Cl.
*F16C 33/58* (2006.01)
*F16C 19/26* (2006.01)
(Continued)

(52) U.S. Cl.
CPC ............ *F16C 33/585* (2013.01); *F16C 19/26* (2013.01); *F16C 33/588* (2013.01); *F16C 33/6614* (2013.01); *F16C 33/6651* (2013.01)

(58) Field of Classification Search
CPC ...... F16C 33/585; F16C 33/588; F16C 33/60; F16C 33/6614; F16C 33/6651; F16C 2220/42

See application file for complete search history.

(56) References Cited

U.S. PATENT DOCUMENTS 1,190,965 A  *  7/1916  Sparr ...................... F16C 19/26
                                                         384/569
1,677,841 A     7/1928  Nice
(Continued)

FOREIGN PATENT DOCUMENTS

DE          3933119 A1      4/1991
DE          4134604 A1      4/1993
(Continued)

OTHER PUBLICATIONS

Machine Translation of FR-2940379-A1 (Year: 2010).*

*Primary Examiner* — Alan B Waits
(74) *Attorney, Agent, or Firm* — J-TEK LAW PLLC; Scott T. Wakeman; Mark A. Ussai

(57) ABSTRACT

A raceway element for a rolling-element bearing, the rolling-element bearing having an inner ring, an outer ring, and a plurality of rolling elements that are disposed between the inner ring and the outer ring. The raceway element is configured as an inner ring or as an outer ring, or is configured to be attachable to an inner ring or outer ring of the bearing, wherein at least one surface of the raceway element is configured as a raceway for the rolling elements. The raceway element is formed from a sheet metal panel having at least one recess formed in the surface configured as the raceway.

17 Claims, 7 Drawing Sheets

(51) Int. Cl.
*F16C 33/64* (2006.01)
*F16C 33/66* (2006.01)

(56) References Cited

U.S. PATENT DOCUMENTS

| | | | | |
|---|---|---|---|---|
| 1,715,268 | A * | 5/1929 | Ayers, Jr. | C21D 9/40 |
| | | | | 29/898.066 |
| 1,967,821 | A * | 7/1934 | Hess | F16C 33/64 |
| | | | | 384/570 |
| 2,016,923 | A * | 10/1935 | Herrmann | F16C 19/466 |
| | | | | 29/898.1 |
| 3,262,185 | A * | 7/1966 | Hornigold | F16C 33/58 |
| | | | | 29/418 |
| 3,579,782 | A | 5/1971 | Hallerback | |
| 3,633,982 | A | 1/1972 | Germann | |
| 3,981,060 | A | 9/1976 | Alling et al. | |
| 4,869,604 | A | 9/1989 | Hill et al. | |
| 4,955,732 | A | 9/1990 | Behrens | |
| 4,999,913 | A | 3/1991 | Kawachi | |
| 5,102,241 | A * | 4/1992 | Pflungner | F16C 27/066 |
| | | | | 384/538 |
| 10,995,793 | B1 | 5/2021 | Sierra | |
| 11,286,986 | B2 * | 3/2022 | Dimartino | F16C 33/121 |
| 2002/0067873 | A1 * | 6/2002 | Wood | F16C 33/60 |
| | | | | 384/276 |
| 2006/0182379 | A1 | 8/2006 | Grell et al. | |
| 2007/0248298 | A1 * | 10/2007 | Chihara | F16C 33/588 |
| | | | | 384/579 |
| 2009/0074344 | A1 | 3/2009 | Lunz | |
| 2011/0035943 | A1 * | 2/2011 | Pohlman | F16C 33/60 |
| | | | | 29/898 |
| 2013/0170779 | A1 | 7/2013 | Eckhoff et al. | |
| 2014/0334760 | A1 * | 11/2014 | Abrahamson | F16C 33/585 |
| | | | | 384/570 |
| 2015/0285306 | A1 | 10/2015 | Akyol et al. | |
| 2016/0169283 | A1 | 6/2016 | Schafers et al. | |
| 2017/0037904 | A1 * | 2/2017 | Makke | F16C 33/6681 |
| 2017/0203354 | A1 | 7/2017 | Mizuta et al. | |
| 2018/0209481 | A1 | 7/2018 | Abrahamson | |

FOREIGN PATENT DOCUMENTS

| | | | |
|---|---|---|---|
| DE | 102014215628 A1 | 2/2016 | |
| DE | 102017109599 A1 | 11/2018 | |
| EP | 1837539 A2 | 9/2007 | |
| FR | 2940379 A1 * | 6/2010 | F16C 19/466 |
| JP | H053647 U | 1/1993 | |
| JP | 2004211774 A | 7/2004 | |
| WO | 2015007279 A1 | 1/2015 | |
| WO | 2016006550 A1 | 1/2016 | |

* cited by examiner

SHEET METAL PANEL RACEWAY INCLUDING RECESSES

CROSS-REFERENCE

This application claims priority to German patent application no. 10 2020 208 272.3 filed on Jul. 2, 2020, the contents of which are fully incorporated herein by reference.

TECHNOLOGICAL FIELD

The present disclosure relates to a sheet metal raceway element for a bearing, and, more specifically, to a sheet metal raceway element for a bearing having at least one recess in the raceway surface. The disclosure also relates to a bearing including the raceway element and a method of manufacturing the raceway element.

BACKGROUND

From the prior art, raceways made from thin-walled metal are known for rolling-element bearings, which raceways are formed by rolling and subsequent deep drawing. For this purpose a pot-shaped raceway blank is generated in possibly multiple deep-drawing steps. The pot-shaped raceway blank has a substantially cylindrical shape, including a collar that is located on the side opposite the closed side of the pot. The deep drawing can be effected in a plurality of steps until the desired height is achieved for the future raceway. Subsequently a base of the pot-shaped raceway blank thus generated is cut out, and the collar generated by the deep drawing is removed.

In order for the raceway thus obtained to have the necessary surface properties, further processing steps, such as, for example, hardening, annealing, or other surface treatments may be required in order to obtain the desired material properties for the raceway.

Accordingly a series of machines as well as process steps are required for the manufacturing of the raceway, with the result that, in particular in the case of small quantities, the manufacturing is uneconomical. In addition, depending on the metal used, such a raceway element may be relatively heavy and expensive.

SUMMARY

It is therefore an aspect of the present disclosure to provide a raceway element that can be manufactured with reduced work and material expense.

In the following a raceway element for a rolling-element bearing is disclosed, wherein the rolling-element bearing comprises an inner ring, an outer ring, and a plurality of rolling elements that are disposed between the inner ring and the outer ring, wherein the raceway element is configured as an inner ring or as an outer ring, or is configured to be attachable to an inner ring or an outer ring of the bearing, wherein at least one surface of the raceway element is configured as a raceway for the rolling elements. In order to reduce material and manufacturing costs, the raceway element is manufactured from a sheet metal panel. In particular, the sheet metal panel can already have a surface treatment required for the finished raceway element. Alternatively the surface treatment can also be effected on the manufactured raceway element and/or in an intermediate step of the manufacturing.

Furthermore, at least one recess, in particular a continuous recess, is formed in the surface of the raceway element, which surface is formed as a raceway. Here the at least one recess can be configured as a lubricant reservoir in order to, for example, improve the lubrication conditions for the rolling elements. Furthermore, the at least one recess also makes it possible to reduce material, which can on the one hand reduce the costs of the raceway element, and on the other hand reduces the weight of the raceway element.

Furthermore, the sheet metal panel can already have the thickness desired for the raceway element. In addition, not just a single raceway element, but rather many raceway elements can be manufactured from the metal plate, which raceway elements can also differ in their dimensions.

The sheet metal panel is preferably manufactured from a metal that is suitable to provide the desired material properties for a raceway. For this purpose known steels can be used in particular, such as, for example, strip steel, construction steel, case hardened steel, or tempered steel. The steel used can preferably be suitable to be welded in order to make possible, for example, a material-bonded connection between two parts. However, other types of connections, such as, for example, an interference-fit connection or a friction-fit connection, can also be used. In particular, the sheet metal panel can already be heat-treated and/or surface-treated. The sheet metal panel preferably has a thickness between 0.5 mm and 4 mm.

Here a first surface of the raceway element can include a raceway that interacts with rolling elements rolling on it. Alternatively the first surface of the raceway element can include a sliding surface that interacts with another sliding surface, so that the raceway elements formed as an inner ring or an outer ring, or the element serving as an inner ring and the element serving as an outer ring for the bearing, or the inner ring and the outer ring of the bearing are rotatable against each other.

According to a further embodiment, the raceway element is formed by laser cutting and/or punching from the sheet metal panel. With the aid of laser cutting, arbitrarily shaped raceway elements can be manufactured without great expense in terms of manufacturing technology. Here the individual dimensions of the raceway elements can be achieved via a simple software controlling or programming of a control device controlling the laser cutting. An individual manufacturing of punching tools that are adapted to the respective raceway can thus be omitted. Raceway elements made of plate, in particular metal plate, are thereby more economical even with smaller quantities.

If the raceway element or the plurality of raceway elements are to be manufactured from a metal plate having a large surface, then a laser cutting device can be relatively easily designed to be movable relative to the metal plate. In addition, forces acting normal to the plane of the metal plate, as is the case with a punching process, that could lead to an undesirable deforming of the edges of the raceway elements, do not arise here. In addition, a particularly precisely shaped edge of the raceway element can be formed by laser cutting, so that, in comparison to a punched edge, for example, a machining post-processing step can generally be omitted. In this way the manufacturing is simplified. Due to the laser cutting, the outer contour can be particularly easily shaped individually so that different shapes for the raceway element can be manufactured with one and the same tool and from a metal plate of one size.

In a first state of the metal panel the raceway element preferably has an outer contour in the shape of an essentially rectangular strip, wherein two opposing sides are configured as joint edges that are connected to each other in a second state in order to form an annular raceway element. In particular, the essentially rectangular strip has two long edges and two short edges, wherein the short edges are preferably configured as joint edges.

According to a further embodiment, the joint edges are formed by punching, and the rest of the outer contour, i.e., the two long edges, are formed by laser cutting. Since the joint edges usually have a shorter length in comparison to the rest of the contour of the raceway element, the negative effects of the punching process can be ignored and their positive properties prevail. In addition, a greater heat development can arise due to the laser cutting, which can lead to a hardening of the edge, which negatively affects a possible later welding of this edge. By punching of the joint edges that are connected to each other for the manufacturing of a finished raceway element, in particular welded, a negative influencing by the possible heat development of the laser cutting, which can generate the above-mentioned hardenings that negatively influence a welding seam, can be prevented.

As mentioned above, according to a further embodiment the one joint edge of the raceway element is connected via a material-bonded, interference-fit, or friction-fit connection to the other joint edge of the raceway element in order to obtain the annular raceway element. Here in particular a material-bonded connection is advantageous, such as, for example, a welded connection. Here in particular a laser welding is preferred as opposed to a resistance welding, since the melting material pushed off during resistance welding can cause protrusions.

According to a further embodiment, the raceway element can alternatively or additionally include at least one chamfer. The chamfer is preferably formed along the joint edges. Here the at least one chamfer can receive the protrusions, such as, for example, upper beads, that arise during welding and thus prevent the slipping or rolling of the rolling elements on the raceway element from being disturbed.

According to one alternative embodiment, in a first state of the sheet metal panel the raceway element has an outer contour in the shape of a parallelogram having two sides extending obliquely with respect to a circumferential direction, wherein the two sides extending obliquely with respect to the circumferential direction are configured as joint edges that are connected to each other in a second state in order to form an annular raceway element.

This has the advantage in particular that the course of the two joint edges connected to each other, i.e., in particular a welding seam, extends obliquely with respect to the circumferential direction of the finished raceway element, so that in particular in the case of rolling elements that have a line-shaped abutment against the finished raceway element (rolling elements with linear contact), each can only encounter a disturbance at a point, but not over the entire line-shaped abutment, when these rolling elements run over the joint edges connected to each other. A connecting point for the raceway element can advantageously be provided, which connecting point minimizes a disturbance of a linear touching or of a linear contact of a rolling rolling-element, in particular in comparison to an exclusively radially extending joint edge, by the rolling contact of the rolling element continuously overrunning the connecting point.

In particular, at least one of the joint edges can be configured at least partially as a first alignment element and/or include at least one first alignment element. Here the first joint edge can be aligned radially, axially, and/or circumferentially with respect to the second joint edge, such that the joint edges to be connected are aligned precisely flush prior to the connecting process, which can be, for example, a welding process. Consequently the risk can be precluded or at least significantly reduced that the joint edges are offset with respect to each other in the connected state. The first and the second joint edge preferably each include an alignment element. The alignment accuracy can thereby be increased.

The second joint edge preferably includes a second alignment element and/or is at least partially configured as a second alignment element, wherein the second alignment element and/or the joint edge at least partially configured as a second alignment element is configured complementary to the first alignment element, so that in the connected state the first joint edge and the second joint edge are aligned radially, axially, and/or circumferentially with respect to each other. Due to the complementary formation, the joint edges can be automatically aligned with respect to each other by the engaging one-into-the-other of the alignment elements or of the joint edges configured as alignment element.

Furthermore it is advantageous if the alignment element is configured such that a movement of the joint edges with respect to each other in the axial and/or radial direction is limited or prevented, so that the connection process can be facilitated and carried out more precisely. For example, the alignment element can include a first and a second section that extend by different distances circumferentially, whereby it is prevented that, with contacting of the joint edges, the first joint edge can be displaced with respect to the second joint edge. The risk is thereby practically precluded that the joint edges are not aligned flush during welding.

Here the alignment element can additionally serve to configure the course of the joint edges connected to each other such that a rolling element having linear contact does not roll over the connecting joint edges along their entire linear contact, but rather only at partial points.

Thus, for example, the first joint edge can include a projection protruding in the circumferential direction, and the second joint edge can include an opening complementary to the protruding projection. The first joint edge can also include a projection protruding in the circumferential direction and an opening recessed in the circumferential direction, and the second joint edge can include an opening complementary to the protruding projection and a projection complementary to the recessed opening. It is also conceivable that the first joint edge includes a plurality of alignment elements, and the second joint edge includes a plurality of complementary alignment elements corresponding to the plurality of alignment elements. The projection and the opening preferably have a triangular shape or a semicircular shape, or the first and second joint edge overall have a wave shape. All shapes serve both for aligning and for minimizing the contact with the over-rolling rolling element.

A further problem in the manufacturing of a raceway element from a sheet metal panel can occur during the round bending of the strip-shaped raceway element, since in particular in the case of greater material thicknesses the rigidity of the sheet metal panel can impede the round bending. According to a further embodiment, the raceway element therefore includes a bending facilitating recess, for example, in the form of a knurling or ribbing, in order to facilitate a bending of the raceway element into ring shape. Here the bending facilitating recess can be provided on one of the surfaces that lies opposite the surface that will form the raceway for the rolling elements. Alternatively or additionally one edge can also include such a bending facilitating recess. Here in particular the at least one bending facilitating recess can extend perpendicular to the circumferential direction or perpendicular to a longitudinal edge of the raceway element. The at least one bending facilitating recess preferably extends continuously over an entire axial length of the finished, i.e., annular raceway element, but extends through the total thickness of the raceway element. A plurality of bending facilitating recesses are preferably uniformly distributed over an entire circumference of the finished, annular raceway element.

An outer contour of the raceway element preferably includes at least one micro-connection point by which the raceway element is connected during its manufacturing, i.e., in particular during the punching of the joint edges, to the sheet metal panel from which the raceway element is manufactured. The at least one micro-connection point is preferably generated during the laser cutting, for example, by the laser beam briefly being interrupted so that an edge is not completely laser-cut and a micro-connection point remains. The at least one micro-connection point can in particular make possible that a plurality of raceway elements are simultaneously formed from the sheet metal panel, but still in the compound structure of the sheet metal panel are subjected to a surface processing, such as, for example, a hardening, annealing, or the like, and/or a profiling, as described below. In particular, the manufacturing of the raceway elements can thereby be designed more efficient.

Furthermore, a surface of the raceway element can be provided with a profile, in particular for rolling elements. The profile can preferably be concave, convex, or straight. In particular, the profile can be applied onto the surface before the raceway element is round-bent in order to form the finished raceway element. The profiling in particular of the raceway can thereby be simplified. For example, the profile can already be provided in the sheet metal panel before the raceway element is released by laser cutting and/or punching. It is also conceivable that the raceway element is provided with the profile after its outer contour is formed by laser cutting and/or punching, but the raceway element is still connected to the sheet metal panel via the micro-connection points. This can in particular make it possible to provide a plurality of raceway elements with a profile in parallel. It is also possible to provide the raceway element with a profile only after the releasing of the micro-connection points.

For the case that the raceway element is configured as a raceway for rolling elements in a rolling-element bearing including an inner ring, an outer ring, and the plurality of rolling elements that are disposed between the inner ring and the outer ring, a flange for the rolling elements can be formed from the same sheet metal panel, wherein the flange is formed one-piece with the raceway element. In particular a connecting of a flange, which is manufactured separately from the raceway element, can thereby be omitted, whereby a complex orienting and connecting of the flange to the raceway element can be omitted. A further flange can be provided on a side that lies opposite the side on which the flange is formed.

The flange is preferably formed by bending. It can be advantageous here when at least one target bending point is formed on at least one surface of the raceway element in order to facilitate the bending. For example, the target bending point can be configured as a notch. However, other forms for the target bending point are also possible.

Furthermore, a region of the raceway element that forms the flange can be rolled and/or milled so that a cross-section of this region is flatter than a cross-section of the rest of the raceway element. A bending of the raceway element in order to form the flange can thereby be simplified.

Since problems can arise during the round bending of the raceway element due to the compressing or stretching of the flange necessary therefor, depending on whether the raceway element is used on an inner ring or on an outer ring, the above-mentioned bending facilitating recess can additionally or alternatively also be formed on an outer edge of the flange in order to facilitate a bending into the ring shape. In particular, a plurality of bending facilitating recesses, preferably in the form of a ribbing or knurling, can be provided that are uniformly distributed circumferentially around the outer edge of the flange.

According to one embodiment the at least one recess is formed in the region of the connected joint edges. Furthermore, the first and second joint edge can each include a first section and a second section, wherein the first section and the second section are defined by the recess, and when the first and second joint edge are connected to each other in order to form the annular raceway element, the first section and the second section are disposed circumferentially offset with respect to each other. A welding seam length can thereby be reduced, which in turn reduces the time that is required for generating the welding seam, and reduces the costs for the welding seam, both with respect to the working time required and with respect to the welding material required. Furthermore, the heat introduced into the raceway element during the welding can be reduced by a shorter welding seam. A further advantage is that when a rolling element rolls over the connected joint edges, contact between the joint edges and the rolling element is minimized.

For example, the at least one recess can have an essentially elongated shape whose longitudinal direction extends obliquely with respect to a circumferential direction of the raceway element. Furthermore, the at least one recess can be disposed along the circumferential direction at an edge region of the raceway element. This makes possible a material savings, which can be undertaken in particular on a part of the raceway that supports no loads, such as is the case, for example, with a balance shaft.

According to a further aspect, a bearing is provided including at least one raceway element described above. Here the bearing can preferably be a rolling-element bearing. The rolling-element bearing can advantageously comprise two of the raceway elements described. For example, an inner ring and/or an outer ring of the bearing can include the raceway element or be formed from the raceway element. The raceway element can also be attached to the inner ring and/or the outer ring. Of course, a bearing or rolling-element bearing can also be used, wherein an element, for example, a shaft, a hollow shaft, or the like, serves as inner ring, or an element, for example, a housing, serves as outer ring. For example, the bearing can be a ball bearing, a cylindrical roller bearing, a tapered roller bearing, or the like.

According to a further aspect, a method is proposed for manufacturing a raceway element described above, wherein the method includes the steps:

providing a sheet metal panel, and forming one or more raceway elements from the sheet metal panel.

Here in particular the raceway element is formed by laser cutting and/or punching. A plurality of elements are preferably formed simultaneously, whereby the manufacturing of the raceway elements can be more efficient, which consequently reduces the manufacturing costs of each individual raceway element, so that even small quantities can be cost-effective.

Furthermore, the method for manufacturing the raceway element can include further steps. For example, the method can comprise one or more of the following steps:

- forming at least one recess in a surface with at least one of the plurality of raceway elements, which surface is configured as a raceway,
- applying a profile onto the raceway element, wherein the profile in particular is concave, convex, or straight,
- folding/bending a flange for the rolling elements from the same sheet metal panel, wherein the flange is formed one-piece with the raceway element,
- releasing the raceway element from the rest of the sheet metal panel by breaking of micro-connection points, via which the raceway element is connected to the rest of the sheet metal panel after forming of the raceway elements, provided the raceway element is attached to the sheet metal panel by the micro-connection points described above, wherein—when necessary
- a partial releasing of the micro-connection points is first effected, so that the flange can be formed and subsequently the micro-connection points that connect the raceway element to the rest of the sheet metal panel are released after the forming of the flange, so that during the folding/forming of the flange the raceway element is still connected to the sheet metal panel via at least a part of the micro-connection points,
- round bending the raceway element,
- material, friction-fit, and/or interference-fit connecting the joint edges.

If a plurality of raceway elements are formed from a sheet metal panel, it can be advantageous in particular to arrange the raceway elements on the sheet metal panel such that the excess material of the sheet metal panel that is not used for a raceway element is minimized. For this purpose, for example, the respective outer contours of the plurality of raceway elements can be arranged on the sheet metal panel such that a region of the outer contour that forms the at least one recess in the round-bent state of the raceway element receives a region that, in the round-bent state of the raceway element, forms a non-recessed region of the raceway element.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers. The direction designations used in the following—axial, radial, circumferential—always refer to the finished raceway element.

Figure 1:
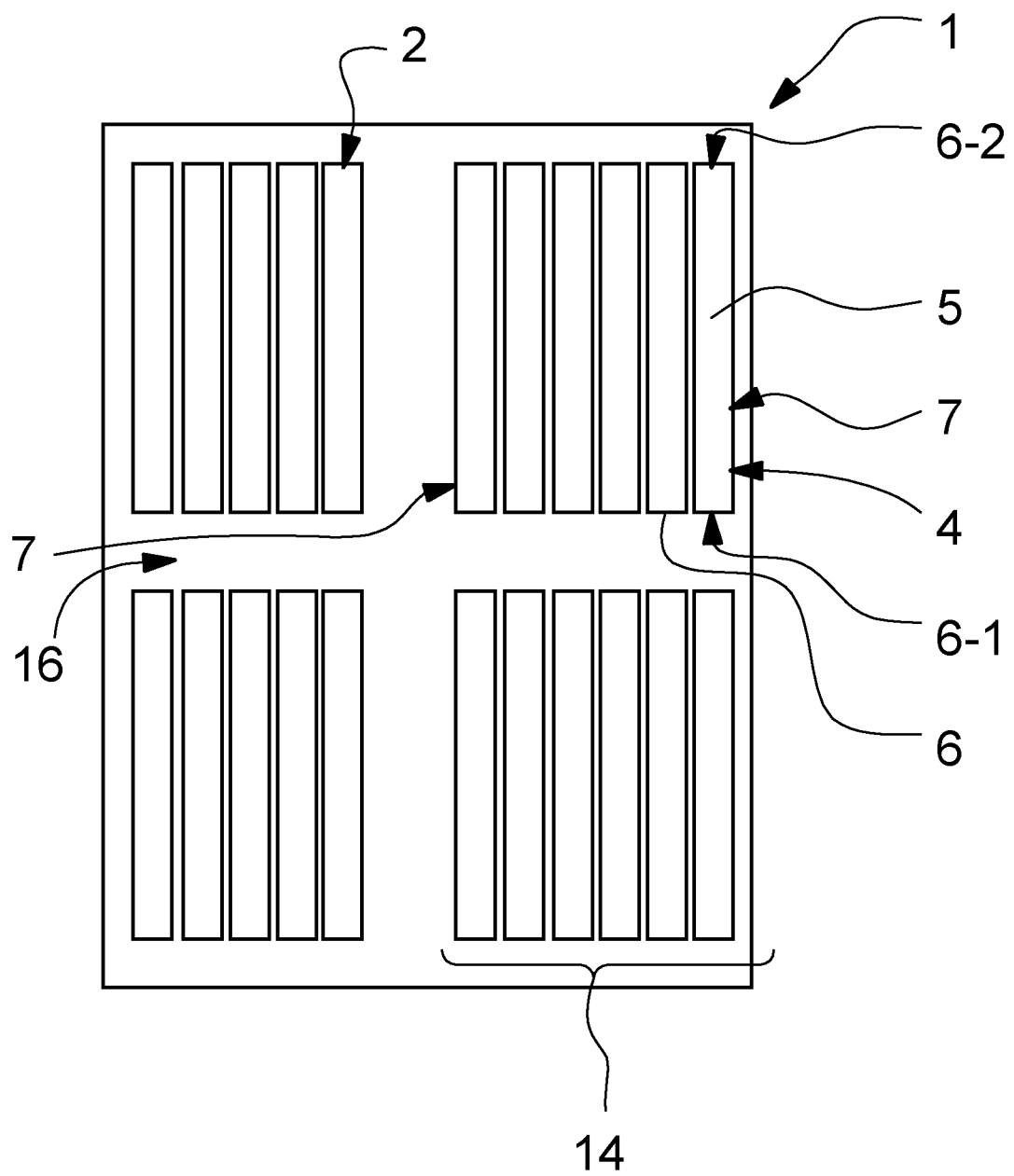
FIG. 1 is a schematic depiction of a sheet metal panel including a plurality of raceway elements according to a first exemplary embodiment.

FIG. 1 shows a schematic depiction of a sheet metal panel 1 including a plurality of raceway elements 2 according to a first exemplary embodiment. Each of the raceway elements 1 has an outer contour 4. As is shown in FIG. 1, a plurality of raceway elements, even differently designed, can be formed from a sheet metal panel 1. Of course, it is also possible to form only one raceway element 2 from a sheet metal panel 1.

As is schematically indicated in FIG. 1 by the line thickness, the outer contour 4 of a respective raceway element 2 is formed by laser cutting and/or punching, wherein the outer contour 4 in the exemplary embodiment shown in FIG. 1 has a rectangular shape.

In particular, a first surface 5 of the raceway element 2 can be configured as a raceway that interacts with rolling elements rolling on it. Alternatively the first surface 5 of the raceway element 2 can be configured as a sliding surface that interacts with another sliding surface such that an element serving as inner ring and an element serving as outer ring for a bearing, or an inner ring and an outer ring of the bearing, are rotatable with respect to each other.

In the exemplary embodiment shown in FIG. 1, in a first state of the sheet metal panel 1 the raceway element 2 has an outer contour 4 in the shape of an essentially rectangular strip having two long edges 7 and two short edges 6. Here the two short edges 6 are configured as so-called joint edges 6-1, 6-2 that are connected to each other in a second state in order to form the annular raceway element 2. Here the connecting of the joint edges 6-1, 6-2 can be effected in a material, friction-fit, or interference-fit manner, wherein a material connection is preferred, in particular by welding.

The joint edges 6-1, 6-2 are preferably formed by punching. Here this punching of the joint edges 6-1, 6-2 can be effected prior to the laser cutting of the rest of the outer contour 4, i.e., of the two long edges 7. However, punching prior to the laser cutting is preferred since the metal plate still has greater stability here.

The great advantage with combined laser cutting/punching or only with laser cutting is that, as shown by way of example in FIG. 1, the raceway element 2 can easily be cut-out from a large-surface sheet metal panel 1. Here a plurality of raceway elements 2 can be obtained from the sheet metal panel 1, which are dimensioned identically as shown in FIG. 1. However, it is also possible that these raceway elements 2 differ in their dimensions.

In order to form a spatial fixing of the raceway element 2 or of the raceway elements 2 for steps, for example, occurring after the laser cutting, such as punching, bending, rolling, stamping, and to improve the manageability of the raceway element 2, the individual raceway elements 2 can preferably each be connected to the rest of the sheet metal panel 1 via micro-connection points 12 (FIG. 5). It can thereby also be made possible to support the plurality of raceway elements formed from the sheet metal panel 1 in a flat state, by the raceway elements 2 still remaining connected to the sheet metal panel 1 via the micro-connection points 12. These micro-connection points 12 may be released only when the respective raceway element 2 is required. The micro-connection points 12 are preferably configured such that a releasing of the raceway element 2 from the sheet metal panel 1 is possible by a simple manual breaking of the micro-connection points 12. Mechanical and/or machine breaking or removing is also possible.

In order to also facilitate the storing and handling or the subsequent further processing, a plurality of raceway elements 2 can be grouped into a "Cluster" 14, wherein stabilizing metal-plate regions 16 are formed between the clusters 14. The stabilizing metal-plate regions 16 can thus prevent the unintentional release of the raceway elements 2 from the sheet metal panel 1. To provide one of the raceway elements 2 it can be provided that first the respective cluster 14 is completely released from the rest of the metal plate 1, and in a subsequent step the desired raceway element 2 is separated from the rest of the cluster 14.

Figure 2A:
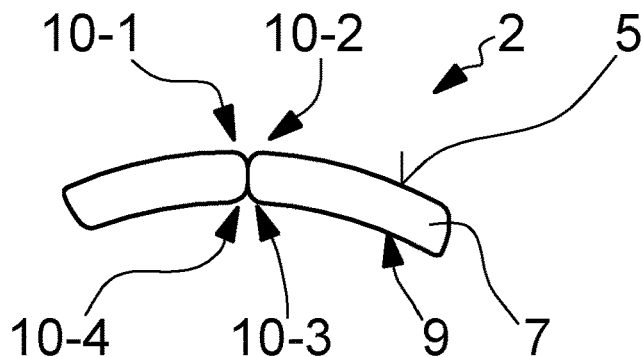
FIG. 2A is a schematic detail view of a round-bent raceway element.

In order to form the finished raceway element 2, it must be brought into a desired shape (FIG. 2A), for example, by round bending, after it has been cut out from the sheet metal panel 1. The result of such a round bending is schematically shown in FIG. 2A, wherein for the sake of simplicity only a part of the round-bent raceway element 2 is shown.

Figure 2B:
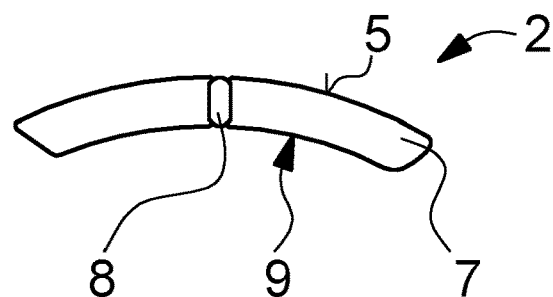
FIG. 2B is a schematic detail view of a round-bent raceway element, wherein the joint edges are connected to each other.

The two joint edges 6-1, 6-2 can be assembled via a connection, for example, a welded connection 8 as mentioned above, in order to form the finished annular raceway element 2. FIG. 2B shows the round-bent raceway element 2 after the two joint edges 6-1, 6-2 are connected to each other by the welded connection 8. In order to prevent excess material from protruding during connecting, in particular over the surface configured as raceway 5, as can be seen in the exemplary embodiment depicted of FIG. 2A or 2B, chamfers 10-1, 10-2, 10-3, 10-4 can be formed along the joint edges 6-1, 6-2. These chamfers serve for receiving excess material that arises during the welding without protrusions of the welding material impairing the raceway 5.

Figure 3:
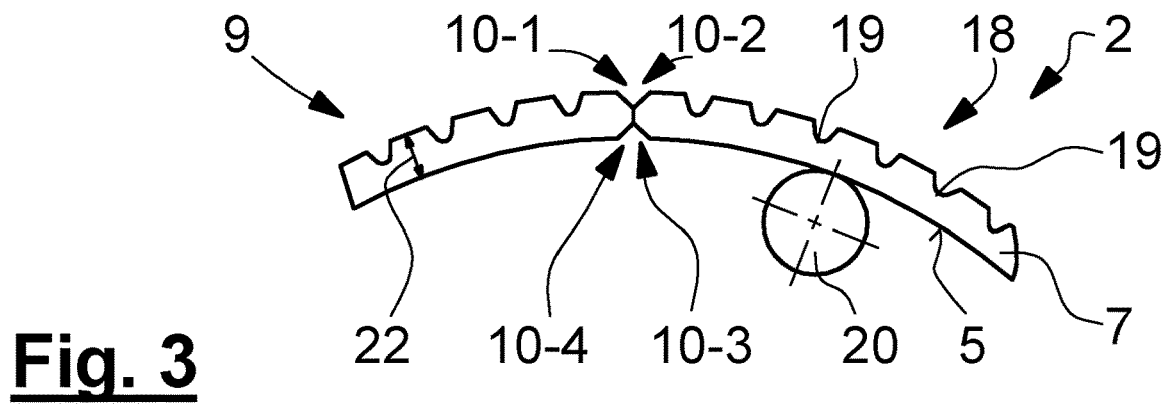
FIG. 3 is a further exemplary embodiment of a raceway element.

FIG. 3 shows a further exemplary embodiment of a raceway element 2. The round bending of the strip-shaped raceway element 2 can be problematic in particular in the case of a sheet metal panel 1 having greater material thickness. Here the round bending of the raceway element 2 can be facilitated with the aid of bending facilitating recesses 19 that are present in the exemplary embodiment depicted in the form of a knurling 18. Here the knurling 18 is preferably provided on a side 9 opposite the surface 5 configured as a raceway. Furthermore, a rolling element 20 is depicted in FIG. 3, which rolling element 20 rolls on the raceway 5.

The knurling 18 comprises a plurality of recesses that are distributed circumferentially over the raceway element 2 and extend perpendicular to the circumferential direction or perpendicular to a long edge 7 of the raceway element 2. The recesses 19 of the knurling 18 preferably extend continuously over an entire axial length of the finished, i.e., annular raceway element 2, but do not extend through the entire thickness 22 of the raceway element.

Figure 4A:
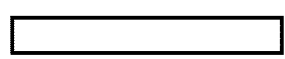
FIG. 4A is a cross-section of a raceway element according to a further exemplary embodiment.
Figure 4B:
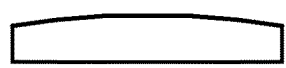
FIG. 4B is a cross-section of a raceway element according to a further exemplary embodiment.
Figure 4C:
FIG. 4C is a cross-section of a raceway element according to a further exemplary embodiment.

FIGS. 4A, 4B, 4C each show a cross-section through a raceway element 2 according to further exemplary embodiments. Depending on the application, the raceway element 2 can be provided with a profile for the raceway 5. FIG. 4A shows a raceway element 2 having a straight raceway profile. FIG. 4B shows a cross-section of a raceway element 2 having a crowned or convex profile that is used, for example, in needle roller bearings. In contrast thereto, FIG. 4C shows a cross-section of a raceway element 2 having a hollow-shaped or concave profile that is used, for example, with toroidal rollers. The profile can be applied onto the sheet metal panel 1 prior to the cutting out or final releasing of the raceway element 2.

In order to ensure, for example, that the rolling elements 20 do not contact along the entire linear contact 21 of the connected joint edges 6-1, 6-2 in the case of rolling elements having a linear contact, i.e., a line-shaped abutment against the raceway 5, such as, for example, needle rollers, cylindrical rollers, tapered rollers, or the like, the connected joint edges 6-1, 6-2 in the exemplary embodiments that are shown in FIGS. 5A to 5D are disposed obliquely with respect to the linear contact 21 or obliquely with respect to the long edge 7 of the raceway element, which long edge 7 is parallel to the circumferential direction of the annular raceway element 2.

Figure 5A:
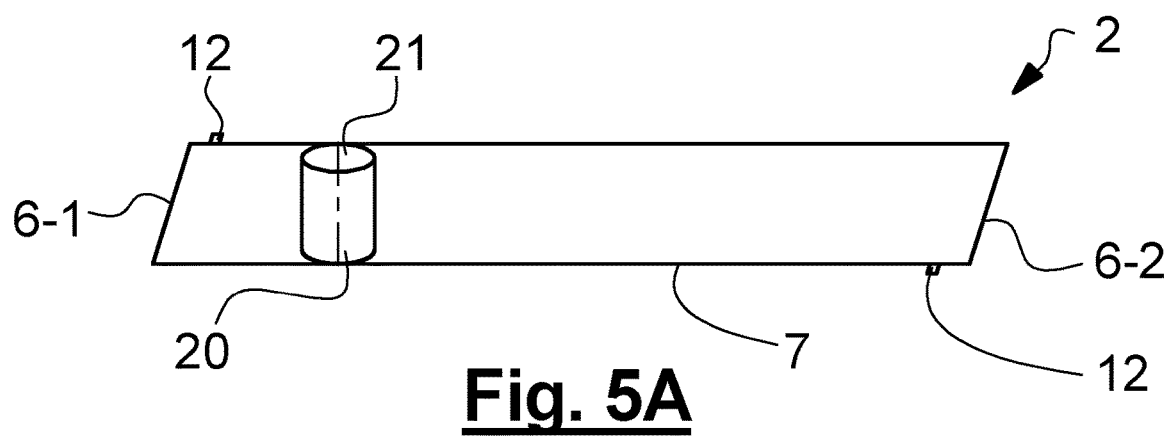
FIG. 5A is a raceway element according to a further exemplary embodiment.

FIG. 5A shows a raceway element 2 in a first state on the sheet metal panel 1, the one outer contour 4 in the shape of a parallelogram having two short sides 6 extending obliquely with respect to a circumferential direction; the short sides 6 are configured as joint edges 6-1, 6-2 that are connected to each other in a second state in order to form an annular raceway element.

Figure 5B:
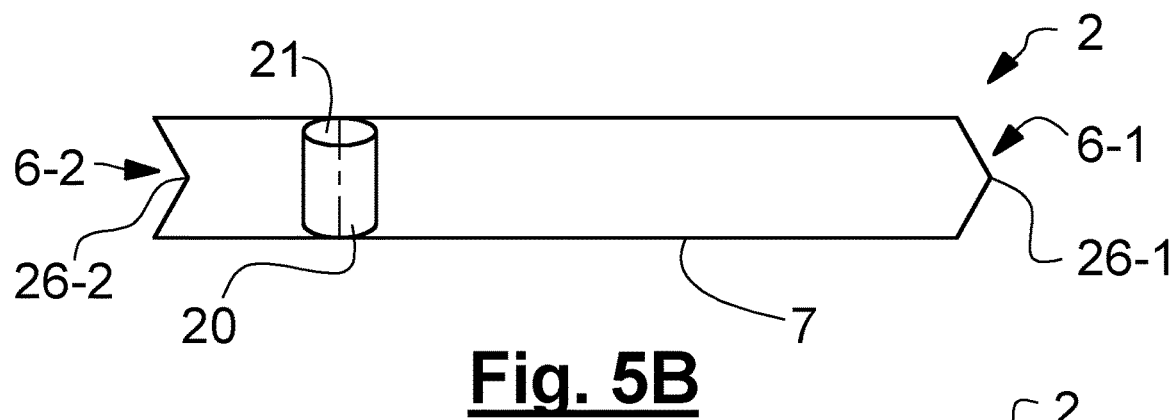
FIG. 5B is a raceway element according to a further exemplary embodiment.
Figure 5C:
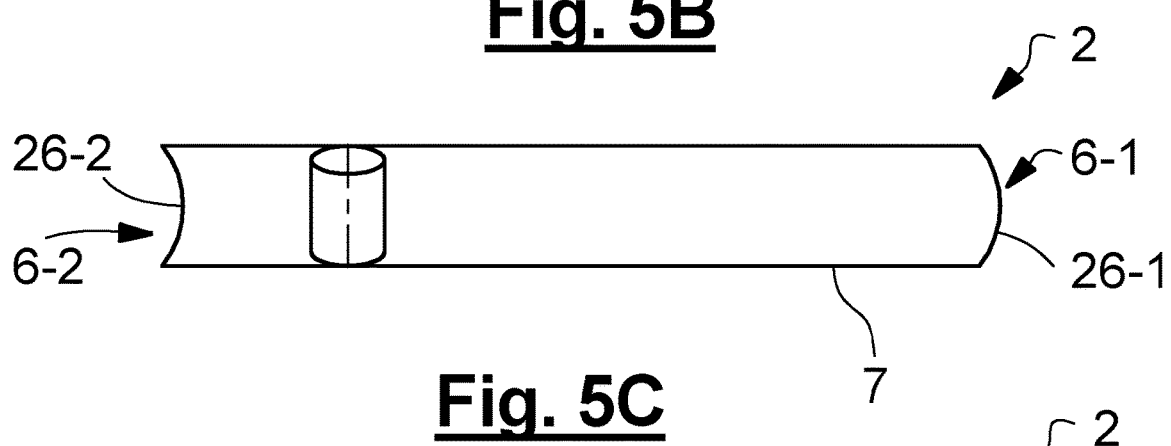
FIG. 5C is a raceway element according to a further exemplary embodiment.
Figure 5D:
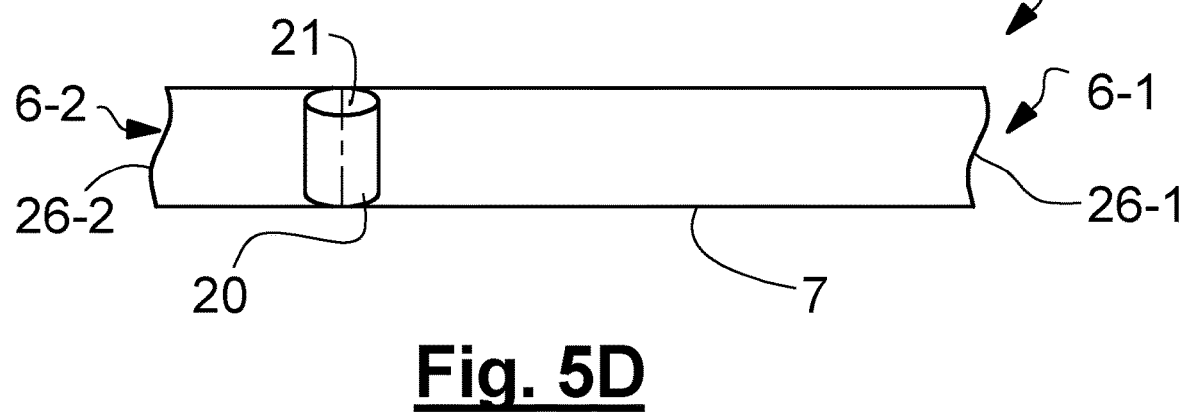
FIG. 5D is a raceway element according to a further exemplary embodiment.

In the raceway elements 2 shown in FIGS. 5B to 5D, the joint edges are additionally configured as a first or second alignment element 26-1, 26-2, using which the first joint edge 6-1 is aligned radially, axially, and/or circumferentially with respect to the second joint edge 6-2, such that the joint edges 6-1, 6-2 to be connected are aligned precisely flush prior to the connection process. As is shown in FIGS. 5B to 5D, the first and the second joint edge 6-1, 6-2 preferably have mutually complementary alignment elements; here the alignment elements 26-1, 26-2 in FIG. 5B have a triangular shape, in FIG. 5C a semicircular shape, and in FIG. 5D a wave shape.

As can be seen from the depicted exemplary embodiments, the alignment element 26-1, 26-2 can additionally serve to configure the course of the joint edges connected to each other such that a rolling element 20 having linear contact 21 does not roll over the connected joint edges 6-1, 6-2 along its entire linear contact 21, but rather only at partial points.

Figure 6A:
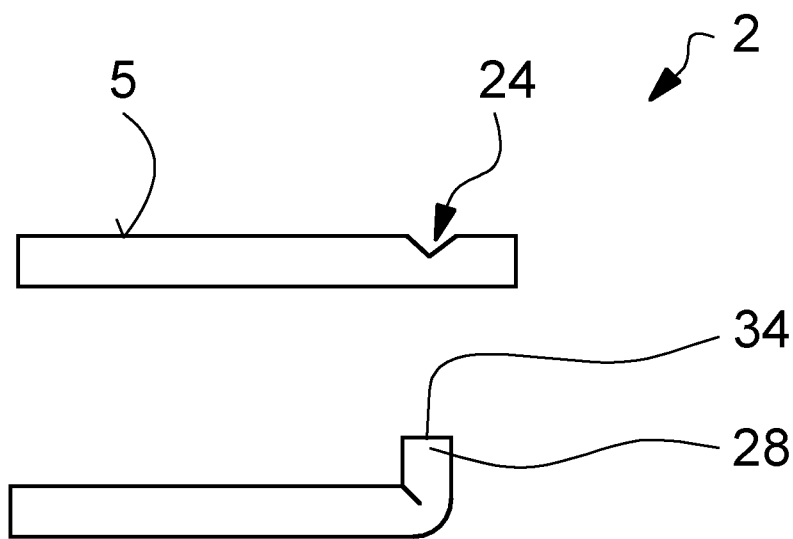
FIG. 6A is a cross-section of a raceway element according to a further exemplary embodiment.
Figure 6B:
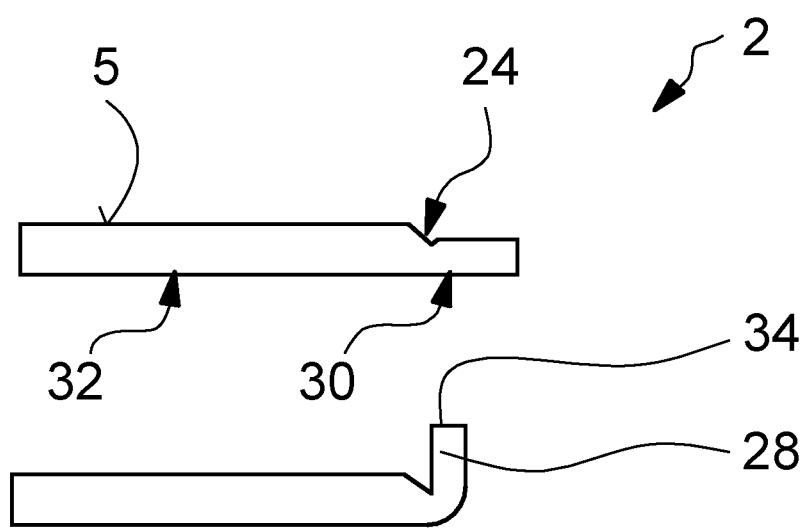
FIG. 6B is a cross-section of a raceway element according to a further exemplary embodiment.

For the case that the raceway element 2 forms a raceway 5 for rolling elements 20 in a rolling-element bearing including an inner ring, an outer ring, and the plurality of rolling elements that are disposed between the inner ring and the outer ring, a flange 28 for the rolling elements 20 is provided in the exemplary embodiments shown in FIGS. 6A and 6B, which flange 28 is formed from the same sheet metal panel 1 and is one-piece with the raceway element 2.

The flange 28 is formed by bending, wherein a target bending point 24 is provided both in the exemplary embodiment in FIG. 6A and in the exemplary embodiment in FIG. 6B. In the exemplary embodiment in FIG. 6B, the target bending point is obtained such that a region 30 of the raceway element 2, which region 30 forms the flange, is rolled and/or milled such that a cross-section of this region 30 is flatter than a cross-section of the rest of the raceway element 32. The flange 24 is subsequently formed by folding, turning up, and/or bending of the region 30. FIG. 6A shows an alternative target bending point 24 in the form of a notch.

Since depending on whether the raceway element 2 is used on an inner ring or on an outer ring, problems can arise during round bending of the raceway element 2 due to the compression or stretching of the flange 28, a knurling can also be provided on an outer edge 34 of the flange 28 in order to simplify the bending of the raceway element 2 even with an existing flange 28.

Figures 7A, 7B, 7C:
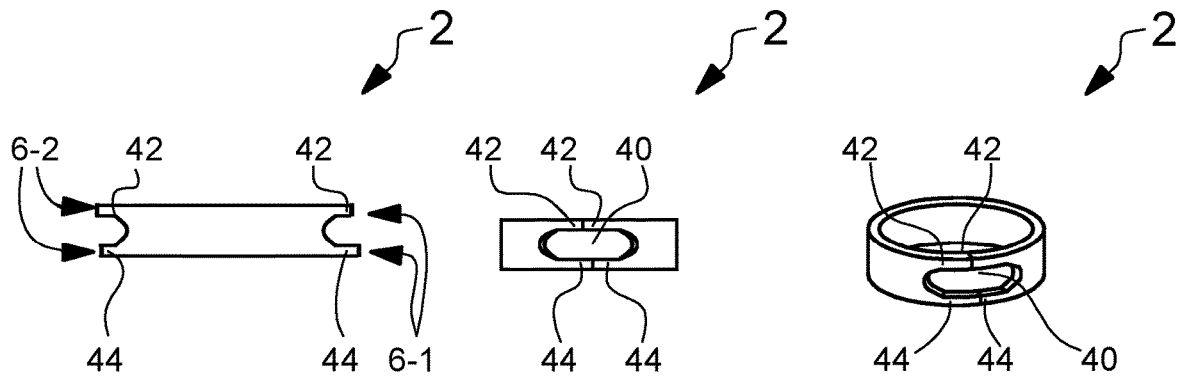
FIG. 7A is a plan view of a raceway element according to a further exemplary embodiment in a first state.
FIG. 7B is a plan view of the raceway element according to FIG. 7A in a second state.
FIG. 7C is a perspective view of the raceway element from FIG. 7B.
Figures 8A, 8B, 8C:
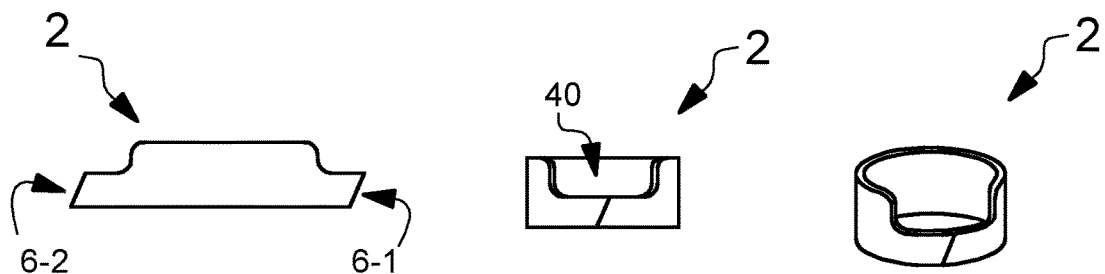
FIG. 8A is a plan view of a raceway element according to a further exemplary embodiment in a first state.
FIG. 8B is a plan view of the raceway element according to FIG. 8A in a second state.
FIG. 8C is a perspective view of the raceway element from FIG. 8B.
Figures 9A, 9B, 9C:
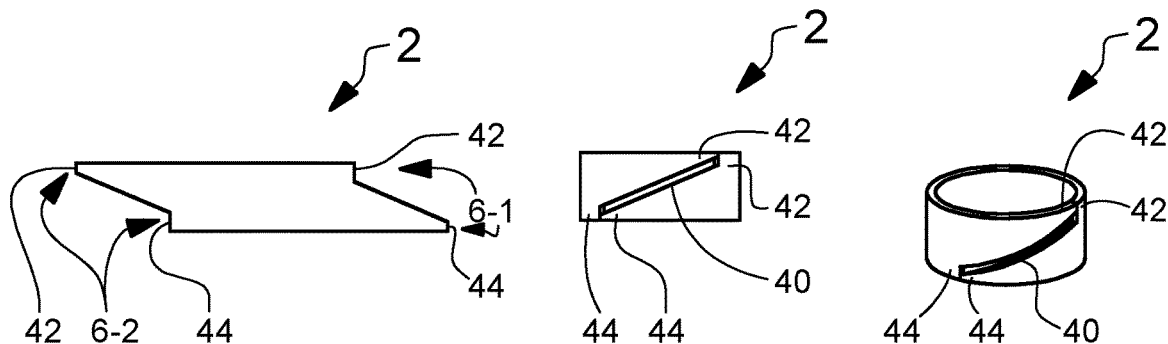
FIG. 9A is a plan view of a raceway element according to a further exemplary embodiment in a first state.
FIG. 9B is a plan view of the raceway element according to FIG. 9A in a second state.
FIG. 9C is a perspective view of the raceway element from FIG. 9B.

FIGS. 7 to 9 show exemplary embodiments for a raceway element including at least one recess 40 that extends continuously through the surface of the raceway element 2, which surface is formed as raceway 5. Here FIGS. 7A, 8A, and 9A each show the raceway element 2 in a first state before the joint edges are connected to each other in order to form the annular raceway element 2. FIGS. 7B, 8B, and 9B show the respective exemplary embodiment of the annular raceway element 2 in a plan view, and FIGS. 7C, 8C, and 9C show the respective exemplary embodiment of the annular raceway element 2 in perspective view.

FIG. 7 shows a raceway element 2 in which the recess 40 is formed as a lubricant reservoir in order, for example, to improve the lubrication conditions for the rolling elements 20 and achieve a weight reduction by material saving. Here the recess 40 is formed in the region of the connected joint edges 6-1, 6-2, wherein the first and second joint edge 6-1, 6-2 each include a first section 42 and a second section 44. The first section 42 and the second section 44 are defined by the recess 40 and are configured such that in the annular state of the raceway element 2 (FIGS. 7B, 7C), the first section 42 and the second section 44 are disposed circumferentially offset with respect to each other.

Furthermore, the at least one recess also makes it possible to reduce material, which can on the one hand reduce the costs of the raceway element, and on the other hand reduces the weight of the raceway element.

FIG. 8 shows a raceway element 2, wherein the recess 40 is disposed on an edge region of the raceway element 2 along the circumferential direction, whereby, for example, a material saving can be achieved in a part of the raceway 5 that supports no loads, such as, for example, with a balance shaft. Furthermore, FIG. 8 in turn shows an oblique course of the connected joint edge 6-1, 6-2, which minimizes the contact between rolling elements having linear contact and joint edges 6-1, 6-2.

Similar to FIG. 7, FIG. 9 shows a raceway element 2, wherein the recess 40 is formed in the region of the connected joint edges 6-1, 6-2 and defines a first section 42 and a second section 44 of the first and second joint edge 6-1, 6-2, wherein in the annular state of the raceway element 2 (FIGS. 9B, 9C) the first and second section 42, 44 are disposed circumferentially offset with respect to each other.

Figure 11:
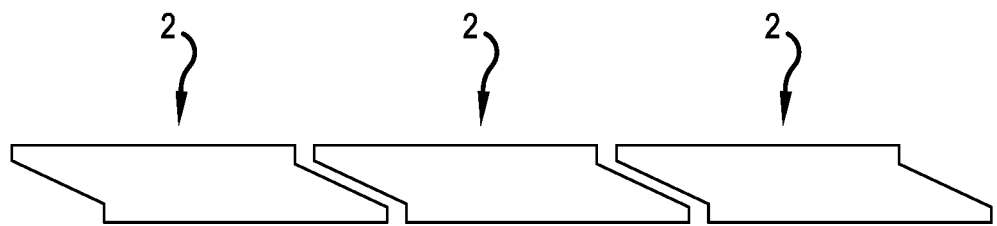
FIG. 11 is a plan view of a plurality of the raceway elements of FIG. 9A arranged on a panel.

FIG. 11 shows that the respective outer contours of the plurality of raceway elements 2 of FIG. 9A can be arranged on a sheet metal panel such that a region of the outer contour that forms the at least one recess in the round-bent state of the raceway element receives a region that, in the round-bent state of the raceway element, forms a non-recessed region of the raceway element.

Figure 12:
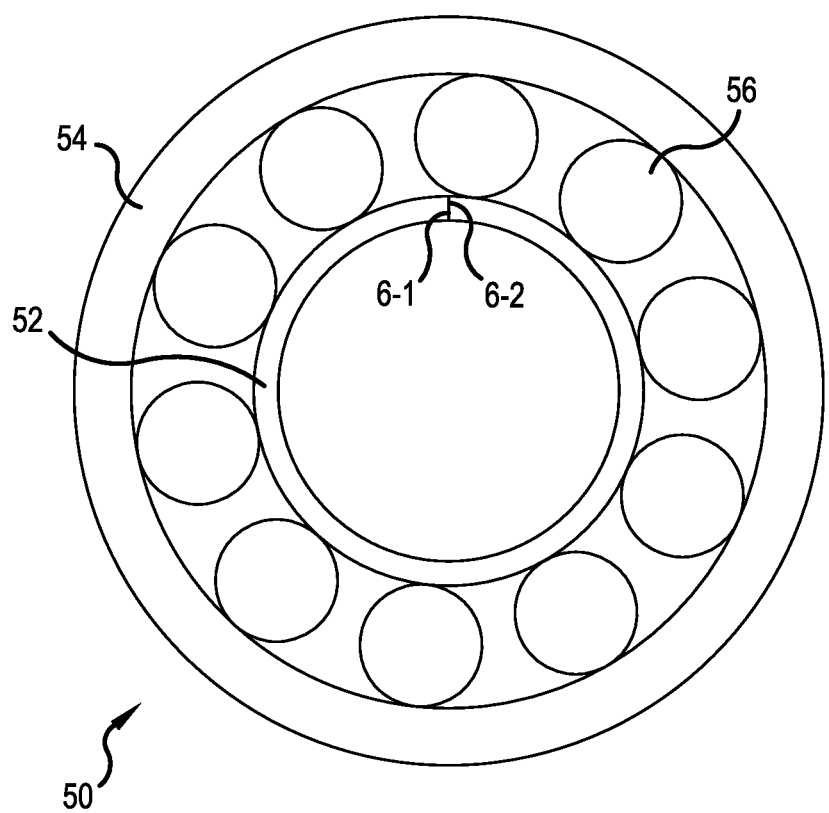
FIG. 12 is a schematic side elevational view of a bearing having a raceway element according to an exemplary embodiment of the disclosure.

FIG. 12 schematically shows a rolling element bearing 50 that includes a raceway element 52. The joint formed by the adjacent joint edges 6-1 and 6-2 of the raceway element 52 is also illustrated. The rolling element bearing 50 further includes a second or outer bearing ring 54 and a plurality of rolling elements 56 between the outer bearing ring 54 and the raceway element 52. Furthermore, the outer bearing ring 54 can also be formed from a raceway element 52.

Also in the exemplary embodiments shown in FIG. 7 and FIG. 9, in addition to minimizing the length of the joint edges, an oblique positioning of the joint edges can also be provided in order to further reduce the contact between rolling elements having linear contact and connected joint edges.

Figure 10:
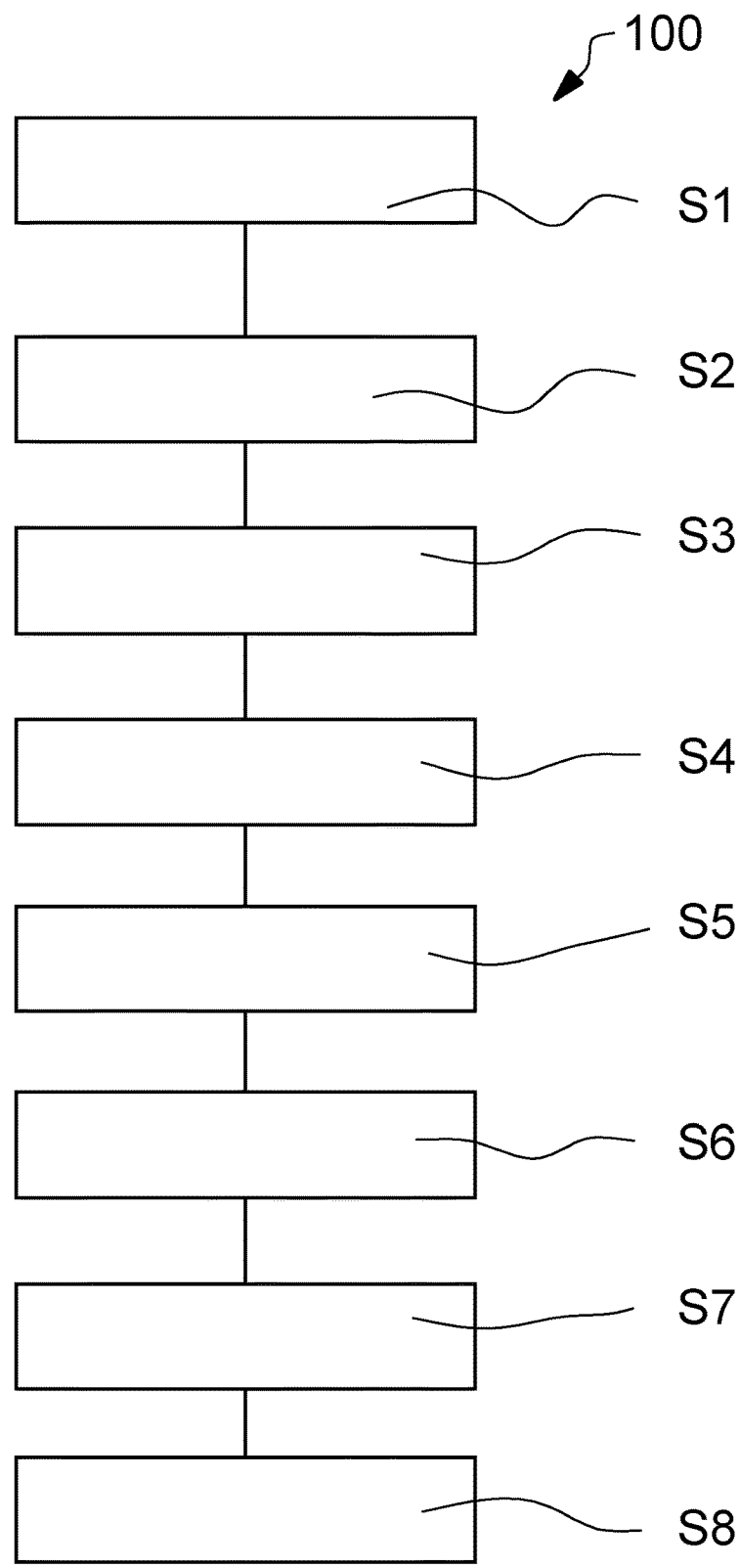
FIG. 10 is a schematic process diagram of a method for the manufacturing of a raceway element according to a further exemplary embodiment.

FIG. 10 shows a schematic diagram of a method 100 for manufacturing a raceway element 2 described above. Here the method comprises a step S1, in which a sheet metal panel 1 is provided. Subsequently in a step S2, one or more raceway elements 2 are formed from the sheet metal panel 1 by laser cutting and/or punching. A plurality of elements 2 are preferably formed simultaneously, whereby the manufacturing of the raceway elements 2 can be more efficient, which consequently reduces the manufacturing costs of each individual raceway element 2, so that even small quantities can be cost-effective.

Depending on the raceway element 2 required, the method 100 can include a step S3, in which at least one recess 40 is formed in a surface configured as raceway 5. Furthermore, in a step S4 a profile can be applied onto the raceway element 2, wherein the profile is in particular concave, convex, or straight. Provided the raceway element 2 is still connected to the sheet metal panel 1 by micro-connection points 12, in a step S5 these micro-connection points 12 can be released by breaking. However, step S5 can also take place at another point during the method.

Furthermore, the method 100 can include a step S6, in which a flange 28 for the rolling elements is formed from the same sheet metal panel, and one-piece with the raceway element, by folding or bending. In order to finally complete the raceway element 2, in a step S7 the raceway element 2 is formed by round bending, and completed in a step S8 by connecting of the joint edges 6-1, 6-2.

In summary a raceway element can be manufactured particularly economically by the raceway element being formed by laser cutting and/or punching, whereby an individual manufacturing is possible without tools that are specifically matched to the dimensions of the raceway element. The raceway element can advantageously be manufactured from a metal plate, wherein during manufacturing the raceway element is still connected to the rest of the metal plate via micro-connection points.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing raceway elements.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Sheet metal panel
2 Raceway element
3 Outer contour
4 Surface
6-1, 6-2 Joint edge
7 Long edge
8 Connection
9 Surface
10-1-10-4 Chamfer
12 Micro-connection point
14 Cluster
16 Metal-plate regions
18 Knurling
19 Bending facilitating recess
20 Rolling element
21 Linear contact
22 Thickness
24 Target bending point
26-1, 26-2 Alignment element
28 Flange
30, 32 Region
34 Edge
40 Recess
42 First section
44 Second section
100 Method
S1-S8 Method steps

What is claimed is:

1. A rolling-element bearing comprising:
a first rolling-element bearing ring comprising a cylindrical raceway element formed from a sheet metal strip having a length and a width and bent into a cylinder such that a first longitudinal end of the strip meets a second longitudinal end of the strip at at least one joint, a surface of the strip forming a raceway of the first rolling-element bearing ring and the surface including at least one recess,
a second rolling-element bearing ring, and
a plurality of rolling elements between the first rolling-element bearing ring and the second rolling-element bearing ring,
wherein the at least one joint includes a first joint and a second joint axially spaced from the first joint, the first joint having a first end at a first axial end of the cylindrical raceway element, and the second joint having a first end at a second axial end of the cylindrical raceway element,
wherein the at least one recess comprises a first recess portion extending into the first end of the strip between a second end of the first joint and a second end of the second joint and a second recess portion extending into the second end of the strip between the second end of the first joint and the second end of the second joint, the first recess portion being contiguous with the second recess portion, and
wherein the at least one recess is elongated with a longest dimension extending in a circumferential direction of the raceway element.

2. The rolling-element bearing according to claim 1, wherein the at least one recess is configured as a lubricant reservoir.

3. The rolling-element bearing according to claim 1, wherein the first end of the strip is materially bonded to the second end of the strip at the first joint and at the second joint.

4. The rolling-element bearing according to claim 1, wherein at least one of the plurality of rolling elements radially overlies the at least one recess, and
wherein the first end of the strip is materially bonded to the second end of the strip at the first joint and at the second joint.

5. The rolling-element bearing according to claim 1, wherein the at least one recess is located entirely in a cylindrical arc of X degrees of the raceway element, and
wherein the remaining cylindrical arc of 360-X degrees of the raceway element is recess-free.

6. The rolling-element bearing according to claim 5, wherein the at least one recess has a first recess end circumferentially spaced from a second recess end, and
wherein the second end of the first joint and the second end of the second joint are located circumferentially between the first recess end and the second recess end.

7. A rolling-element bearing comprising:
a first rolling-element bearing ring comprising a cylindrical raceway element formed from a sheet metal strip having a length and a width and bent into a cylinder such that a first longitudinal end of the strip is materially bonded to a second longitudinal end of the strip at at least one joint, a surface of the strip forming a raceway of the first rolling-element bearing ring and the surface including at least one recess, a second rolling-element bearing ring, and a plurality of rolling elements between the first rolling-element bearing ring and the second rolling-element bearing ring, wherein a first axial end of the cylindrical raceway element lies in a first plane and a portion of a second axial end of the cylindrical raceway element lies in a second plane parallel to the first plane, wherein the at least one recess extends axially into the cylindrical raceway from the second plane, and wherein the at least one joint extends from the first axial end of the raceway to the first recess.

8. The rolling-element bearing according to claim 7, wherein the at least one recess is elongated with a longest dimension extending in a circumferential direction of the raceway element.

9. The rolling-element bearing according to claim 7, wherein the at least one joint comprises no more than one joint.

10. The rolling-element bearing according to claim 7, wherein the second axially end of the raceway includes no more than one recess and the first axially end of the raceway is recess-free.

11. The rolling-element bearing according to claim 7, wherein at least one of the plurality of rolling elements radially overlies the at least one recess.

12. The rolling-element bearing according to claim 7, wherein the at least one recess is elongated with a longest dimension extending in a circumferential direction of the raceway element, wherein the at least one joint comprises no more than one joint, wherein the first end of the strip is materially bonded to the second end of the strip, and wherein at least one of the plurality of rolling elements radially overlies the at least one recess.

13. A rolling-element bearing comprising:

a first rolling-element bearing ring comprising a cylindrical raceway element formed from an octagonal sheet metal strip having a length and a width and bent into a cylinder such that a first longitudinal end of the strip meets a second longitudinal end of the strip at at least one joint, a surface of the strip forming a raceway of the first rolling-element bearing ring and the surface including at least one recess, a second rolling-element bearing ring, and a plurality of rolling elements between the first rolling-element bearing ring and the second rolling-element bearing ring, wherein the at least one recess is elongated with a longitudinal direction extending obliquely to a circumferential direction of the raceway element.

14. The rolling-element bearing according to claim 13, wherein the first end of the strip is materially bonded to the second end of the strip at the at least one joint.

15. The rolling-element bearing according to claim 13, wherein the at least one joint comprises a first joint extending axially inward from a first axially facing edge of the raceway element and a second joint extending axially inward from a second axially facing edge of the raceway element, and wherein the first joint is circumferentially offset from the second joint.

16. The rolling-element bearing according to claim 15, wherein the first end of the strip is materially bonded to the second end of the strip at the first joint and at the second joint.

17. The rolling-element bearing according to claim 16, wherein the at least one recess includes a first recess having a first end at an end of the first joint and a second end at an end of the second joint.

\* \* \* \* \*